United States Patent [19]

Dobbs et al.

[11] Patent Number: 4,650,592
[45] Date of Patent: Mar. 17, 1987

[54] SELF LUBRICATING SILICON NITRIDE ARTICLE

[75] Inventors: Robert J. Dobbs, Monroeton, Pa.; David E. Thomas, Skanesteles, N.Y.; Dale E. Wittmer, Towanda, Pa.

[73] Assignee: GTE Products Corporation, Stamford, Conn.

[21] Appl. No.: 737,997

[22] Filed: May 28, 1985

[51] Int. Cl.[4] ............................................. F16C 33/00
[52] U.S. Cl. ..................................... 252/12.2; 75/231; 420/578; 419/13; 419/27; 501/97
[58] Field of Search ...................... 252/12.2; 420/578; 75/231; 419/13, 27; 501/97

[56] References Cited

U.S. PATENT DOCUMENTS

| | | | |
|---|---|---|---|
| 3,676,343 | 7/1972 | Dietz | 252/25 |
| 3,883,314 | 5/1975 | Schnyder et al. | 252/12.2 |
| 4,229,217 | 10/1980 | Hähn | 419/13 |
| 4,511,402 | 4/1985 | Miura et al. | 419/13 |

*Primary Examiner*—Jacqueline V. Howard
*Attorney, Agent, or Firm*—Donald R. Castle; L. Rita Quatrini

[57] ABSTRACT

An article is disclosed comprising particles of a silicon nitride based material and a lubricating material, the lubricating material occupying interconnected spaces within the article, the spaces being at least about 3% by volume of the article.

3 Claims, No Drawings

SELF LUBRICATING SILICON NITRIDE ARTICLE

BACKGROUND OF THE INVENTION

This invention relates to an article made of silicon nitride based material and a lubricating material so that in use the article is self lubricating.

Currently self lubricating articles are used in various applications. For example cemented carbide shafts are used because of their high wear resistance. These articles have to be lubricated which is relatively expensive. They cannot be made self lubricating. Steel or bronze shafts which are oil impregnated are unsatisfactory because of unacceptably high wear on the shaft even though starting torque is low due to the oil.

Therefore, a self lubricating article having relatively high wear resistance and relatively low weight would be desirable in various applications such as in shafts which can be used in place of bearings and sliding membranes, etc.

SUMMARY OF THE INVENTION

In accordance with one aspect of this invention, there is provided an article comprising particles of a silicon nitride based material and a lubricating material, the lubricating material occupying interconnected spaces within the article, the spaces being at least about 3% by volume of the article.

DETAILED DESCRIPTION OF THE INVENTION

For a better understanding of the present invention, together with other and further objects, advantages, and capabilities thereof, reference is made to the following disclosure and appended claims in connection with the foregoing description of some of the aspects of the invention.

The starting material used in making the article of this invention is a silicon nitride based material. Generally any silicon nitride based material which can be densified by sintering can be used. A preferred silicon nitride based material consists essentially of in percent by weight about 2% aluminum oxide, about 6% yttrium oxide and the balance silicon nitride.

According to one method of obtaining the silicon nitride based material the components are first blended together by any conventional method which results in a relatively uniform admixture suitable for the subsequent pressing, forming, and heating operations. A preferred method is described below. The individual components are first milled. The milling is done preferably in a vibration energy mill. One such preferred mill is the "Vibro Energy" grinding mill manufactured by SWECO, Inc., a subsidiary of Emerson Electric Company. The resulting admixture is then passed through a 40 mesh screen. An aqueous slip is then prepared of the resulting screened material. The slip is then passed through a 100 mesh screen and spray dried to form the relatively uniform admixture.

The admixture is then isopressed at conditions which result in a preformed porous article having a total porosity or spaces of generally about 30% by volume of the article with at least about about 10% by volume of the total porosity or spaces being interconnected porosity. The interconnected porosity or spaces therefore make up at least about 3% by volume of the article itself. The interconnecting porosity will be subsequently filled with a lubricating material. Articles having interconnected porosity or spaces of less than about 3% by volume of the article generally provide insufficient lubrication in the application. The interconnecting spaces can occupy greater than about 3% by volume of the article. However if the volume of the interconnecting spaces is too great, for example, making up about 10.5% by volume of the article (or about 35% by volume of the total porosity), the strength of the article is compromised and there is a high liklihood of the final article breaking in the application.

The isopressing is done preferably at from about 5,000 psi to about 15,000 psi at ambient temperature.

In practice, the article can be of any shape depending on the application, for example, shafts or sliding membranes.

An alternate method of making the preformed porous article is by premixing by any conventional method, the components of the silicon nitride based material with an amount of a substance that can be subsequently burned out in the firing operation. One such substance that can be used is paraffin. The resulting mixture is then isopressed as described previously.

The resulting preformed porous article is then sintered to densify the particles of the porous article to at least about 96% of the theoretical density of the silicon nitride based material. The sintering is done generally at from about 1500° C. to about 1950° C. with from about 1700° C. to about 1880° C. being preferred, for from about 1 hour to about 6 hours with from about 3.5 hours to about 4.5 hours being preferred. The sintering is done generally under nitrogen at from about 25 psi to about 300 psi with about 200 psi being especially preferred.

The spaces of the sintered porous article are then filled with a lubricating material to form the final self lubricating article of this invention. This operation can be done by any standard method known in the art. For example, the sintered porous article is first evacuated, followed by introduction of the lubricating material into the spaces.

The lubricating material can be any lubricating material known in the art, for example light machine oils which are generally introduced into the porous article as described above.

The lubricating material can be molybdenum disulfide in which case it is introduced into the sintered porous article by pressure infiltration to form the final self lubricating article of this invention.

An alternate method of forming the article of this invention is by premixing the lubricating material with the individual components of the silicon nitride based material. This is done by any conventional mixing method. The lubricating material used in this method must be thermally stable so that it will not react or burn off in the subsequent sintering operation. A preferred thermally stable lubricating material suitable for use is boron nitride. The resulting admixture is then isopressed at conditions, generally from about 15,000 psi to about 30,000 psi at ambient temperature which result in the preformed article in which the lubricating material is contained in the interparticle spaces. The resulting preformed article is then sintered as described previously to densify the particles of the silicon nitride based material, and produce the final self lubricating article of this invention.

The articles of this invention which can be produced by various known methods, some of which have been herein described, comprise particles of a silicon nitride based material and a lubricating material, the lubricating material occupying interconnected spaces within the article, the spaces occupied by the lubricating material being at least about 3% by volume of the article.

The articles of this invention have a high degree of wear resistance due to the microhardness of the particles, very low weight due to their low bulk density because of the relatively high porosity, and are self lubricating due to being impregnated with lubricating material. Such products find application in high speed miniature equipment components as shafts and sliding membranes.

In the application, the lubricating material is drawn to the surface or is present as an integral part of the surface to provide lubrication to the mating members. Any wear will continually expose a source of additional lubrication.

While there has been shown and described what are at present considered the preferred embodiments of the invention, it will be obvious to those skilled in the art that various changes and modifications may be made therein without departing from the scope of the invention as defined by the appended claims.

What is claimed is:

1. An article comprising particles made of a silicon nitride based material and a lubricating material, and lubricating material occupying interconnected spaces within said article, said spaces being at least from about 3% to about 10.5% by volume of said article.

2. An article of claim 1 wherein said silicon nitride based material consists essentially of in percent by weight about 2% aluminum oxide, about 6% yttrium oxide, and the balance silicon nitride.

3. An article of claim 1 wherein said particles have a density of at least about 96% of the theoretical density, and wherein the total porosity of said article is about 30% by volume of said article.

* * * * *